US 6,865,054 B2

(12) United States Patent  
Sawai

(10) Patent No.: US 6,865,054 B2
(45) Date of Patent: Mar. 8, 2005

(54) MAGNETIC TAPE DEVICE WITH A PRESSING MECHANISM

(75) Inventor: Kunio Sawai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 520 days.

(21) Appl. No.: 09/938,172

(22) Filed: Aug. 23, 2001

(65) Prior Publication Data

US 2002/0024760 A1 Feb. 28, 2002

(30) Foreign Application Priority Data

Aug. 23, 2000 (JP) .................................. 2000-006044 U

(51) Int. Cl.[7] .......................................... G11B 15/675
(52) U.S. Cl. ................................................... 360/96.5
(58) Field of Search .......................................... 360/96.5

(56) References Cited

U.S. PATENT DOCUMENTS 5,907,451 A * 5/1999 Akieda ...................... 360/96.5
5,978,173 A * 11/1999 Chu et al. .................. 360/96.5
6,021,018 A * 2/2000 Sawai et al. ................ 360/96.5
6,038,100 A * 3/2000 Nagatsuka .................. 360/96.6
6,212,028 B1 * 4/2001 Fujishiro .................... 360/96.5

FOREIGN PATENT DOCUMENTS

JP          4-310663       11/1992
JP          9-204718        8/1997

* cited by examiner

Primary Examiner—Tianjie Chen
(74) Attorney, Agent, or Firm—Osha & May L.L.P.

(57) ABSTRACT

In a magnetic tape device, a recessed groove 41 protruding from a moving table. A press spring 16 engaged with the lever 8 is pressed against the rod 5. The table is slightly pushed-in in a backward motion b direction by inserting a tape cassette to the table which is on standby at a cassette inserting position. When the pushing is detected and a driving source is activated, the lever 8 is swung backward (d), whereby the moving table is moved backward (b) via the rod 5 to a cassette placing position. A cam 42 is formed in the groove 41, and when the moving table is pushed-in from the cassette inserting position in the backward motion b direction, the rod 5 is transferred onto the cam 42 to increase the pressing force of the spring 16.

4 Claims, 10 Drawing Sheets

MAGNETIC TAPE DEVICE WITH A PRESSING MECHANISM

BACKGROUND OF THE INVENTION

1. Field of the Invention

The present invention relates to a magnetic tape device in which a tape cassette can be surely injected.

2. Description of the Related Art

Conventionally, techniques of a magnetic tape device are disclosed in JP-A-4-310663 and the like. An example of such techniques will be described with reference to FIGS. 8 to 10. In this example, a pair of right and left guide plates 3a and 3b stand in parallel on a chassis 2 in a case 1. A plurality of guide rods 5 which protrude from the side faces of a tape cassette moving table 4 placed between the guide plates 3a and 3b are movably passed through substantially L-like guide holes 6 that are opened in the guide plates 3a and 3b, so that the moving table 4 can be moved forward and backward (a and b) between a cassette inserting position A and a cassette placing position B. Rocking levers 8 which are pivotally attached to the guide plates 3a and 3b via pivot shafts 7 so as to be swung forward and backward (c and d) are engaged with the front guide rods 5, respectively. A worm gear 11 which is rotated by a driving source (not shown) meshes with a worm gear 10 which is formed in an outer peripheral face of a center portion of a rotating cam 9 that is rotatably disposed on the rear face of the chassis 2. A bevel gear 12 formed in an upper outer peripheral face of the rotating cam 9 is interlockingly connected to a gear 13 formed in a basal end portion of the rocking lever 8 by a clutch gear mechanism 14. The reference numeral 15 denotes a top plate which extends between the guide plates 3a and 3b.

Referring to FIG. 8, 17 denotes movable tape guide posts which pull out a magnetic tape t from a tape cassette T to wind the tape around a head cylinder 18, 19 denotes a full-track erase head, 20 denotes an audio erase head, 21 denotes an audio control head, 22 denotes stationary tape guide posts, 23 denotes a back tension posts, 24 denotes a capstan, and 25 denotes a pinch roller.

In the above-mentioned configuration, when a tape cassette T is injected into a tape cassette insertion port 1a of the case 1 under the state where the moving table 4 is on standby at the cassette inserting position A as indicated by the solid line in FIG. 10, the tape cassette T is inserted to the moving table 4 because the clutch of the gear mechanism 14 is disengaged, whereby the moving table 4 is slightly pushed-in in the direction of the backward motion b. In response to a detection signal from a detector (not shown) which detects the pushing-in, the clutch of the gear mechanism 14 is set to the engaged state by the driving source via the worm gear 11, the worm gear 10, and the rotating cam 9, and the rotating cam 9 and the rocking levers 8 are integrally interlockingly connected to each other via the gear mechanism 14. Thereafter, when the rocking levers 8 are swung backward (d) by the driving source, the moving table 4 is horizontally moved backward (b) along the guide holes 6, and then vertically lowered to be placed at the cassette placing position B (see the phantom line in FIG. 10). The magnetic tape t is then pulled out from the tape cassette T (see the phantom line in FIG. 8), and subjected to a process such as replay.

When an eject button (not shown) is pressed, the rocking levers 8 are swung forward (c) in response to an eject signal by the driving source via the gear mechanism 14 and the like. As a result, the moving table 4 at the cassette placing position B is vertically lifted along the guide holes 6, and then moved horizontally forward (a) to the cassette inserting position A, so that the tape cassette T is ejected (see the solid line in FIG. 10).

As shown in FIGS. 11A and 11B, a recessed groove 8a which is formed in a tip end portion of one of the rocking levers 8 is fitted onto the respective one of the guide rods 5, a press spring 16 is wound around a protruding portion 8b protruding from a center portion of the rocking lever 8, one end portion of the press spring 16 is engaged with an engaging piece 8c protruding from a front edge portion of the rocking lever 8, and the other end portion of the press spring 16 is engaged with the guide rod 5. Therefore, the pressing force P of the press spring 16 is applied to the moving table 4 via the guide rod 5 in the direction of the backward motion b, so that the moving table 4 placed at the cassette placing position B is prevented from being accidentally lifted by the pressing force P (see the phantom line in FIG. 10).

In the above configuration, under the state where the moving table 4 is on standby at the cassette inserting position A, the rocking lever 8 is held at the foremost position D as indicated by the solid line in FIG. 11A. When the tape cassette T is injected into the tape cassette insertion port 1a under this state, the tape cassette T is inserted to the moving table 4, whereby the moving table 4 is pushed-in in the direction of the backward motion b. In accordance with this pushing-in movement, the rocking lever 8 is swung backward (d), and the moving table 4 is passed through a predetermined pushing zone K to reach a detection position E (see the phantom line in FIGS. 11A and 11B). In response to the detection signal from the detector which detects the pushing-in, the operation is switched to an automatic pulling-in operation. The driving source is then activated to perform the above-mentioned operations, so that the moving table 4 is moved backward (b) to the cassette placing position B.

In the above configuration, when the tape cassette T is quickly injected, the pushing-in operation on the moving table 4 to which the tape cassette T is inserted is sometimes performed so insufficiently that the rocking lever 8 which has been once swung backward (d) is swung forward (c) by repulsion and the tape cassette T is pushed back to the tape cassette insertion port 1a.

SUMMARY OF THE INVENTION

In view of the drawback, it is an object of the invention to provide a magnetic tape device in which a tape cassette can be surely injected.

In order to attain the object, according to a first aspect of the invention, in a magnetic tape device which has a tape cassette moving table that is placed to be movable forward and backward between a cassette inserting position and a cassette placing position that are set between a pair of right and left guide plates, and in which a recessed groove that is formed in a tip end portion of a rocking lever pivotally attached to one of the guide plates is engaged with a guide rod protruding from the moving table, a press spring that is engagingly held by the rocking lever is pressed against the guide rod, the moving table is slightly pushed-in in a backward motion direction by inserting a tape cassette to the moving table that is on standby at the cassette inserting position, and a driving source is activated in response to detection of the pushing, thereby backward swinging the rocking lever, and backward moving the moving table via the guide rod to the cassette placing position, a cam is formed in the recessed groove of the rocking lever, and, when the moving table is pushed-in from the cassette inserting position in the backward motion direction, the guide rod is transferred onto the cam to increase a pressing force of the press spring.

According to this configuration, when, during the injecting operation, a tape cassette is inserted to the moving table which is on standby at the cassette inserting position, the moving table is slightly pushed-in in the backward motion direction, and the guide rod protruding from the moving table is transferred onto the cam formed in the recessed groove of the rocking lever, to increase the pressing force of the press spring, so that the increased pressing force prevents the moving table from being pushed back in the forward motion direction. Even when the moving table is insufficiently pushed in, therefore, the moving table is not returned to the state where it has not yet been pushed in, and hence the tape cassette can be surely injected.

The press spring has a return preventing function which prevents the moving table from being returned during the injecting operation as described above, and a pressing function which prevents the moving table placed at the cassette placing position from being accidentally lifted. Since the press spring is used for exerting both the two functions, the number of parts can be reduced and the production cost can be lowered.

When the moving table is to be pressingly placed at the cassette placing position by the press spring so as not to be lifted, the pressing force of the press spring is returned to the original one so that an excessive pressing force is not applied. During the ejecting operation, therefore, the moving table can be easily lifted up from the cassette placing position.

In summary, the operations of injecting and ejecting a tape cassette are allowed to be performed smoothly and surely, simply by slightly changing an existing structure. Therefore, the invention can be practically used.

According to a second aspect of the invention, in a magnetic tape device which has a tape cassette moving table that is placed to be movable forward and backward between a cassette inserting position and a cassette placing position that are set between a pair of right and left guide plates, in which the moving table is slightly pushed-in in a backward motion direction by inserting a tape cassette to the moving table that is on standby at the cassette inserting position, and a driving source is activated in response to detection of the pushing, thereby backward moving the moving table to the cassette placing position, return preventing means, operating when the moving table is pushed from the cassette inserting position in the backward motion direction, for preventing the moving table from being pushed back in a forward motion direction is disposed.

According to this configuration, when, during the injecting operation, the moving table is pushed-in in the backward motion direction by inserting a tape cassette to the moving table which is on standby at the cassette inserting position, the return preventing means operates to prevent the moving table from being pushed back in the forward motion direction. Even when the moving table is insufficiently pushed in, therefore, the moving table is not returned to the state where it has not yet been pushed in, and hence the tape cassette can be surely injected.

According to a third aspect of the invention, in the second aspect of the invention, a guide rod protrudes from the moving table, a recessed groove that is formed in a tip end portion of a rocking lever pivotally attached to one of the guide plates is engaged with the guide rod, a press spring which is engagingly held by the rocking lever, and which is pressed against the guide rod is disposed, the return preventing means is configured by a cam which is engaged with the press spring, and, when the moving table is pushed-in from the cassette inserting position in the backward motion direction, a pressing force of the press spring is increased by the cam to prevent the moving table from being pushed back in the forward motion direction.

According to this configuration, when, during the injecting operation, the moving table is pushed-in in the backward motion direction by inserting a tape cassette to the moving table which is on standby at the cassette inserting position, the pressing force of the press spring is increased by the cam to prevent the moving table from being pushed back in the forward motion direction. Even when the moving table is insufficiently pushed in, therefore, the moving table is not returned to the state where it has not yet been pushed in, and hence the tape cassette can be surely injected.

According to a fourth aspect of the invention, in the third aspect of the invention, the cam is formed in the recessed groove of the rocking lever, and, when the moving table is pushed-in from the cassette inserting position in the backward motion direction, the guide rod is transferred onto the cam to increase the pressing force of the press spring.

According to this configuration, when, during the injecting operation, the moving table is pushed-in in the backward motion direction by inserting a tape cassette to the moving table which is on standby at the cassette inserting position, the guide rod protruding from the moving table is transferred onto the cam formed in the recessed groove of the rocking lever, to increase the pressing force of the press spring, so that the increased pressing force prevents the moving table from being pushed back in the forward motion direction. Even when the moving table is insufficiently pushed in, therefore, the moving table is not returned to the state where it has not yet been pushed in, and hence the tape cassette can be surely injected.

DETAILED DESCRIPTION OF THE PREFERRED EMBODIMENTS

Figure 1:
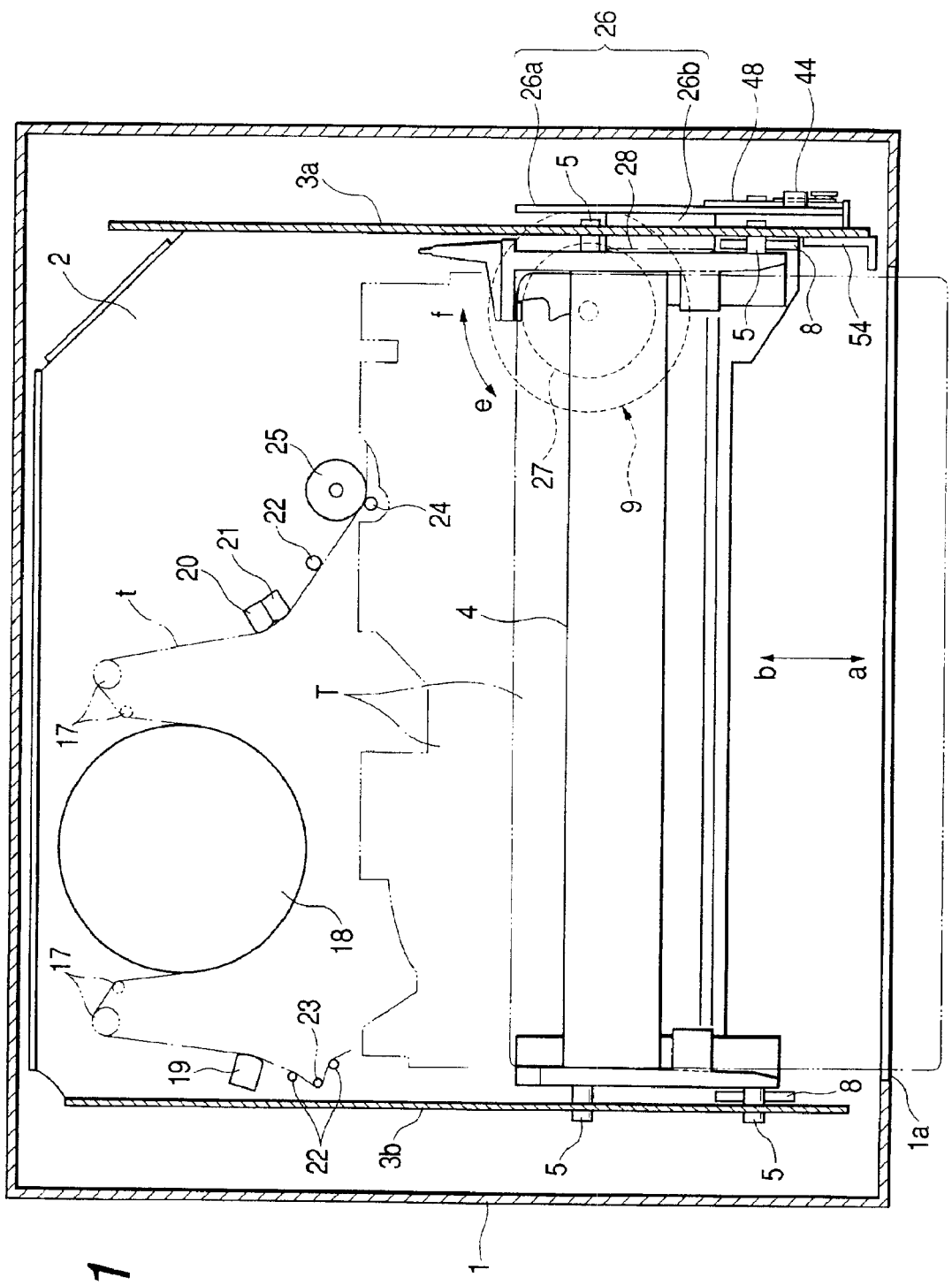
FIG. 1 is a diagrammatic plan view of a magnetic tape device which is an embodiment of the invention.
Figure 2:
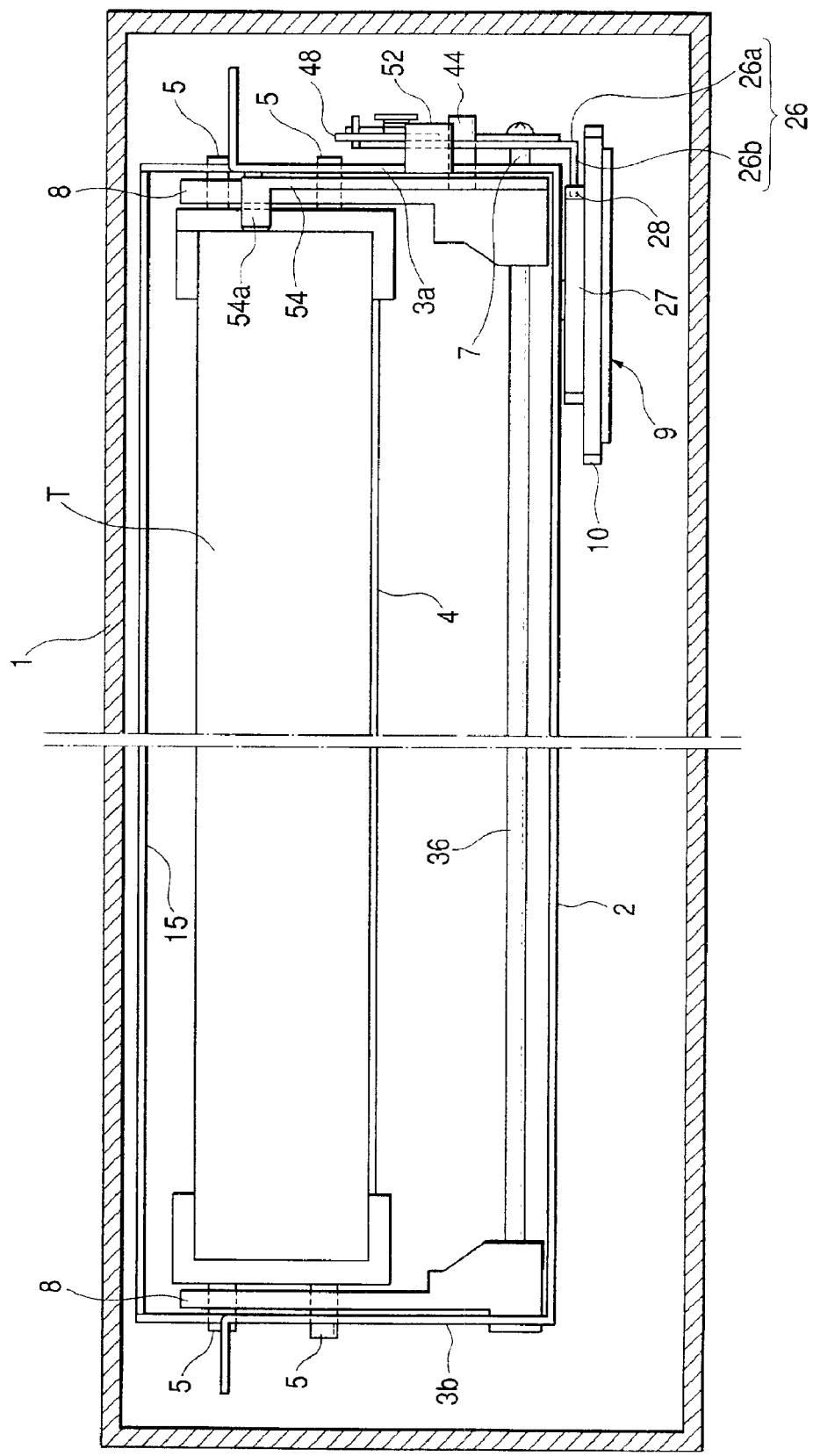
FIG. 2 is an enlarged partially cutaway front view of the embodiment.

Now, a description will be given in more detail of preferred embodiments of the invention with reference to the accompanying drawings.

FIGS. 1 to 6 show a magnetic tape device which is an embodiment of the invention. A pair of right and left guide plates 3a and 3b are formed integrally with a chassis 2 by bending a steel plate into a substantially U-like shape. Rocking levers 8 for moving forward and backward (a and b) a moving table 4 placed between the guide plates 3a and 3b, and a rotating cam 9 are interlockingly connected to each other via a slide plate 26. With respect to the configuration other than that described above, components identical with those of the configuration shown in FIGS. 8 to 11A, 11B are denoted by the same reference numerals, and their description is omitted.

As shown in FIGS. 2 to 6, the slide plate 26 includes: the slide plate body 26a which is placed so as to be slidable along the right guide plate 3a; and a bent piece 26b which is bent into a substantially L-like shape from the lower edge of the slide plate body 26a to elongate toward the rotating cam 9. A rack 28 which is to be engaged with a pinion 27 of the rotating cam 9 is formed on the bent piece 26b. The slide plate 26 can be economically mass-produced from a steel plate.

Figure 3:
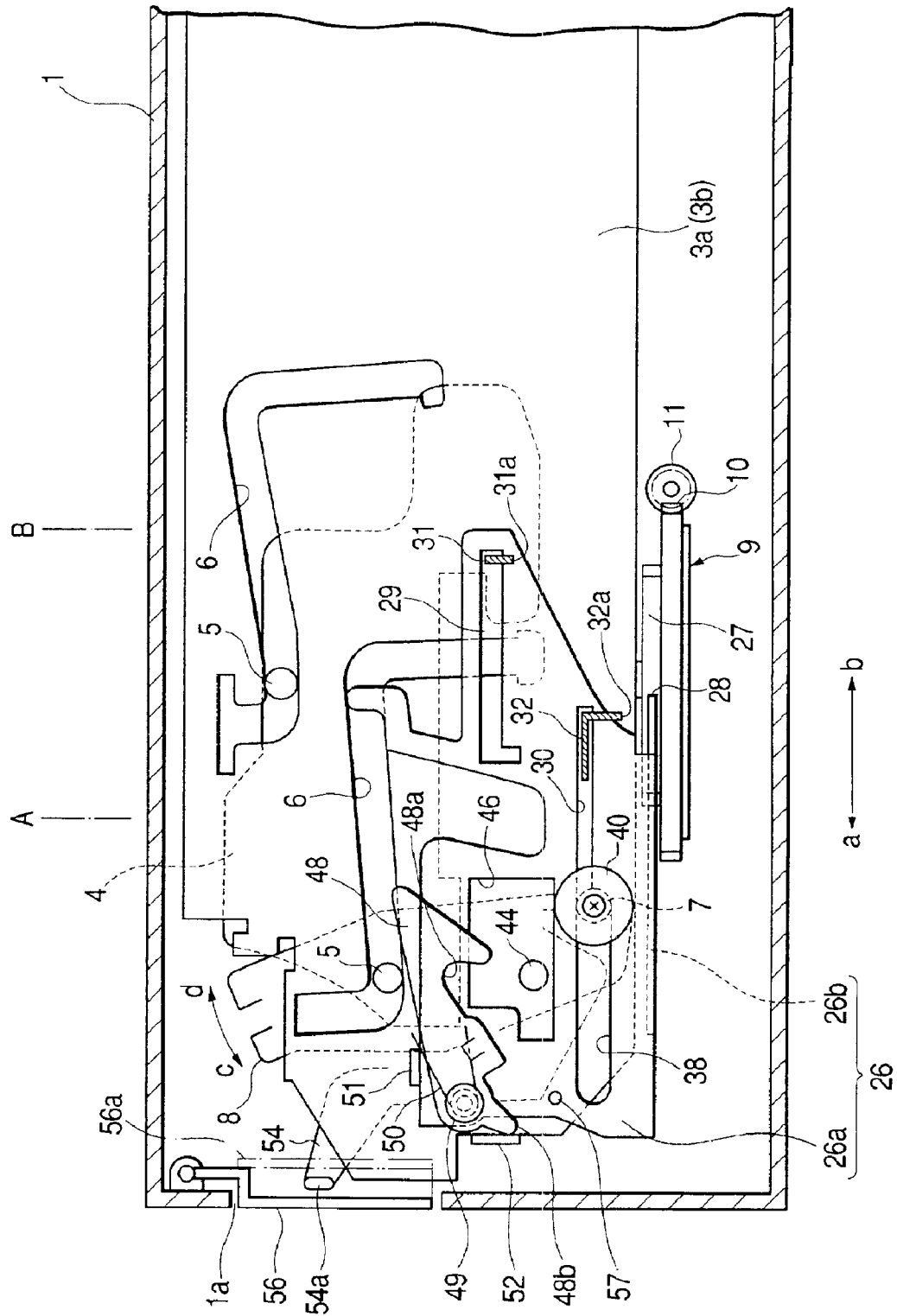
FIG. 3 is an enlarged partially cutaway side view of the embodiment in the state where a moving table is forward moved.

As shown in FIG. 3, a pair of upper and lower slits 29 and 30 are formed in the slide plate body 26a along the forward and backward motion directions a and b. Support pieces 31 and 32 which protrude from the right guide plate 3a are passed through the slits 29 and 30, respectively. Retaining portions 31a and 32a which are formed by bending tip end portions of the support pieces 31 and 32 abut against the outer side face of the slide plate body 26a. According to this configuration, the slide plate 26 can be supported so as not to be vertically moved, and supported so as not to be separated from the right guide plate 3a.

As shown in FIGS. 2, 6, and 7A, 7B, the rocking levers 8 are respectively disposed inside the guide plates 3a and 3b so as to constitute paired right and left rocking levers, and integrally connected to each other through a connecting shaft 36. Pivot shafts 7 which protrude from the outer side faces of the rocking levers 8 so as to be coaxial with the connecting shaft 36 are rotatably passed through holes 37 of the chassis 2, respectively, whereby the rocking levers 8 are enabled to be swung forward and backward (c and d) about the pivot shafts 7. The pivot shaft 7 of the right rocking lever 8 is passed through an oblong hole 38 which is formed in the slide plate body 26a along the forward and backward motion directions a and b. A retaining washer 40 which is fixedly attached to an end face of the pivot shaft 7 by a screw 39 abuts against an outer side face of the slide plate body 26a. Recessed grooves 41 which are respectively formed in the rocking levers 8 so as to elongate from the tip end to the basal end are fitted onto front guide rods 5 which protrude from both the side faces of the moving table 4, respectively. End portions of press springs 16 are engaged with the guide rods 5, respectively.

Figure 7A:
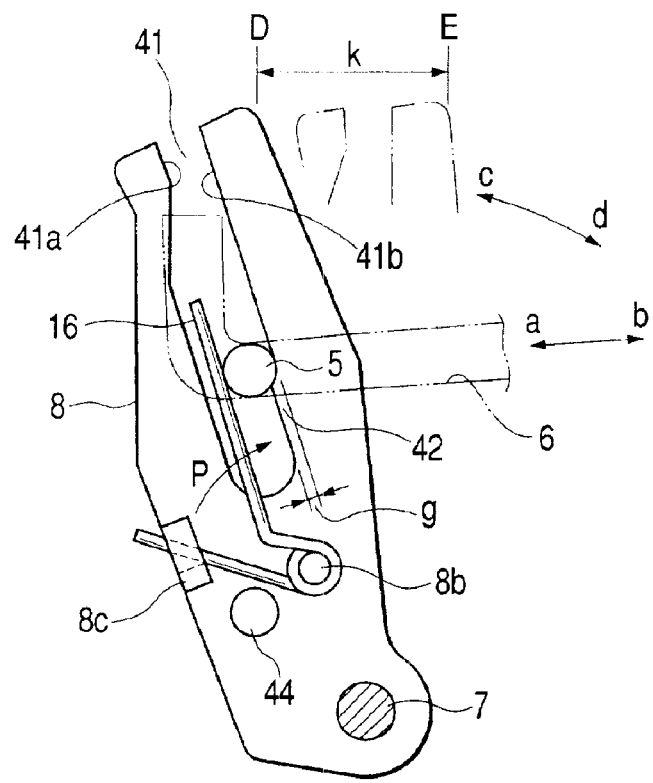
FIG. 7A is a side view of a rocking lever which is stopped at the foremost position.
Figure 7B:
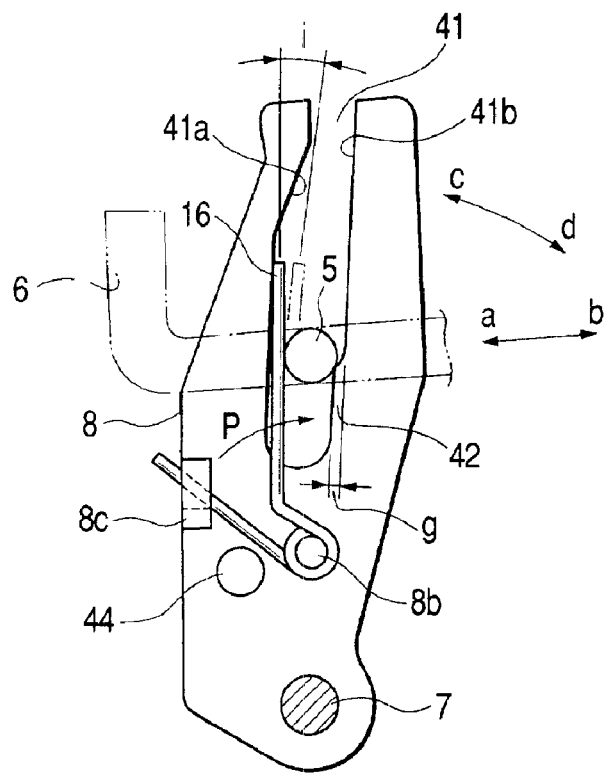
FIG. 7B is a side view showing the rocking lever which reaches a detection position.
Figure 8:
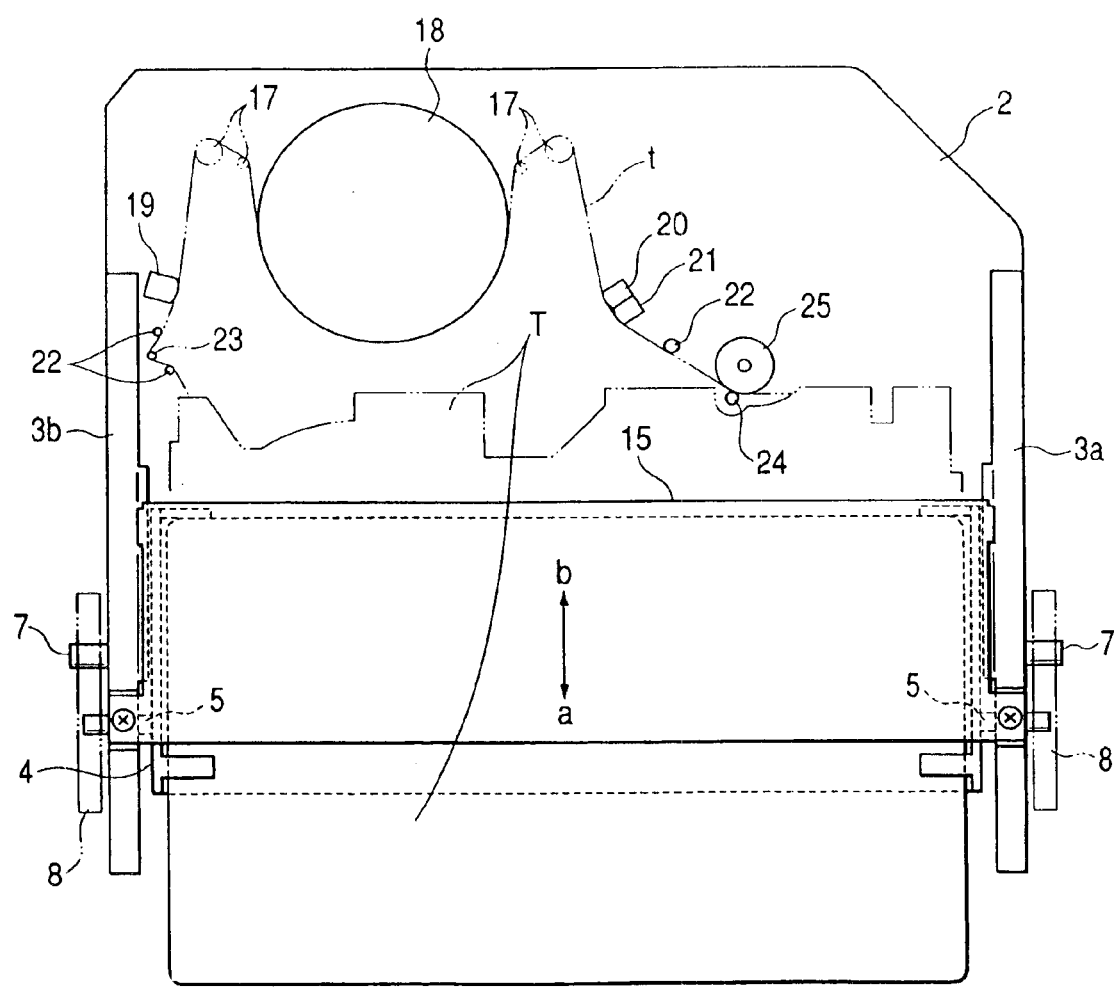
FIG. 8 is a diagrammatic plan view showing a conventional art example.
Figure 9:
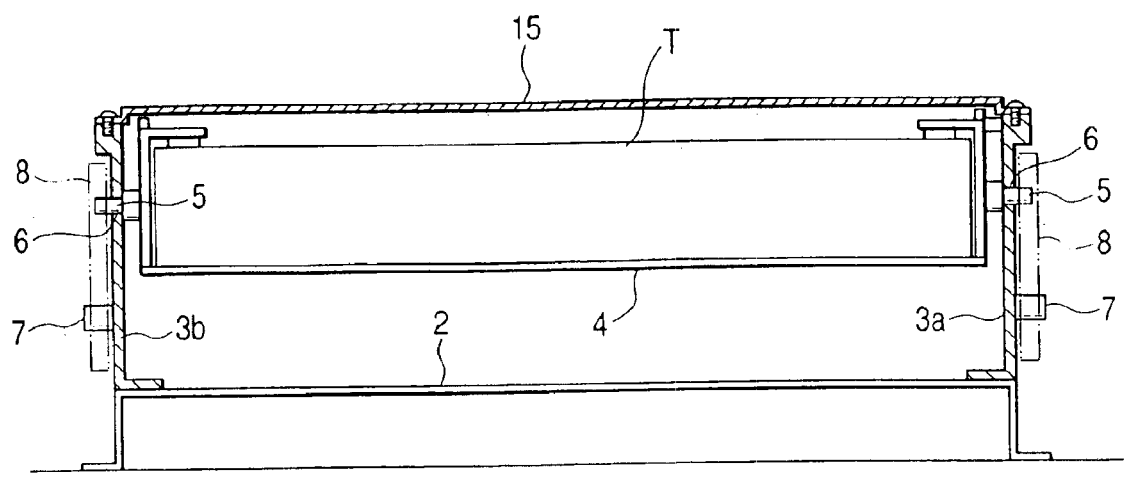
FIG. 9 is a partially cutaway front view of the example.
Figure 10:
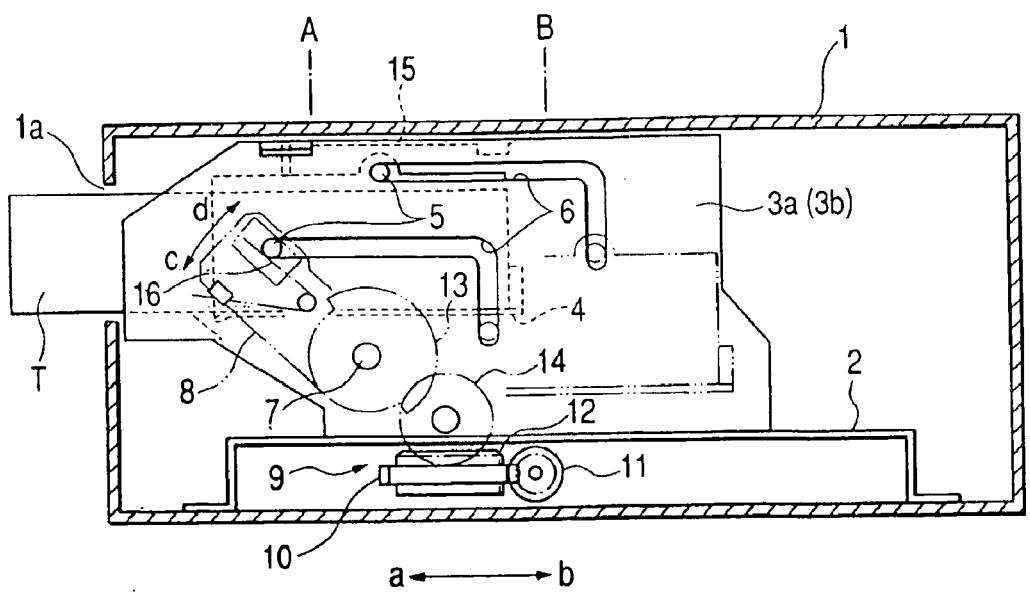
FIG. 10 is a partially cutaway side view of the example.
Figure 11A:
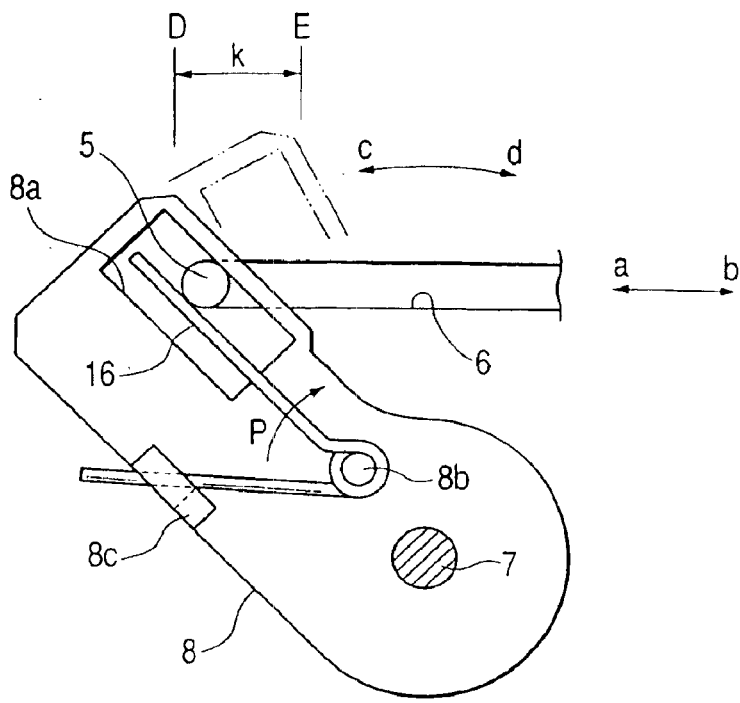
FIG. 11A is a side view of a rocking lever which is stopped at the foremost position.
Figure 11B:
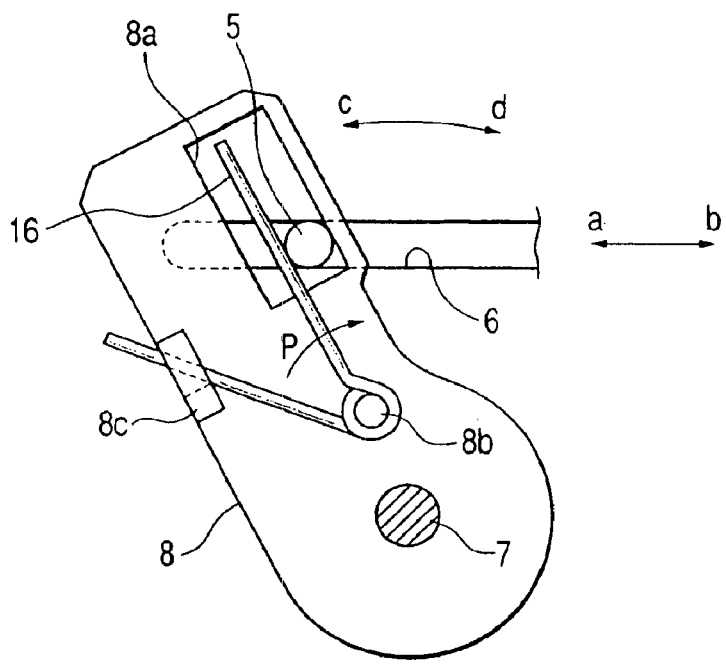
FIG. 11B is a side view showing the rocking lever which reaches a detection position.

As shown in FIGS. 7A and 7B, in each of the recessed grooves 41, a cam 42 which forward protrudes by a predetermined distance g is formed in an inner portion of one of front and rear inner side faces 41a and 41b, or the rear inner side face 41b. When the moving table 4 at a cassette inserting position A is moved backward (b) under the state indicated by the solid line in FIG. 7A, the guide rod 5 is pushed along the guide hole 6 in the direction of the backward motion b. Then, also the rocking lever 8 is swung backward (d) by the guide rod 5, and the guide rod 5 is transferred onto the cam 42 (see FIG. 7B), whereby the other end portion of the press spring 16 is forward pushed by a predetermined distance i to increase the pressing force P of the press spring 16. The increased pressing force P prevents the moving table 4 from being pushed back in the direction of forward motion a.

According to this configuration, when, during the injecting operation, the moving table 4 to which the tape cassette T is inserted is slightly pushed-in in the direction of the backward motion b, the guide rod 5 is transferred onto the cam 42 to increase the pressing force P of the press spring 16. Even when the moving table 4 is insufficiently pushed in, therefore, the moving table 4 is not returned to the state where it has not yet been pushed in, and hence the tape cassette T can be surely injected.

The press spring 16 has a return preventing function which prevents the moving table 4 from being returned during the injecting operation as described above, and a pressing function which prevents the moving table 4 placed at the cassette placing position from being accidentally lifted. Since the press spring is used for exerting both the two functions, the number of parts can be reduced and the production cost can be lowered.

Figure 4:
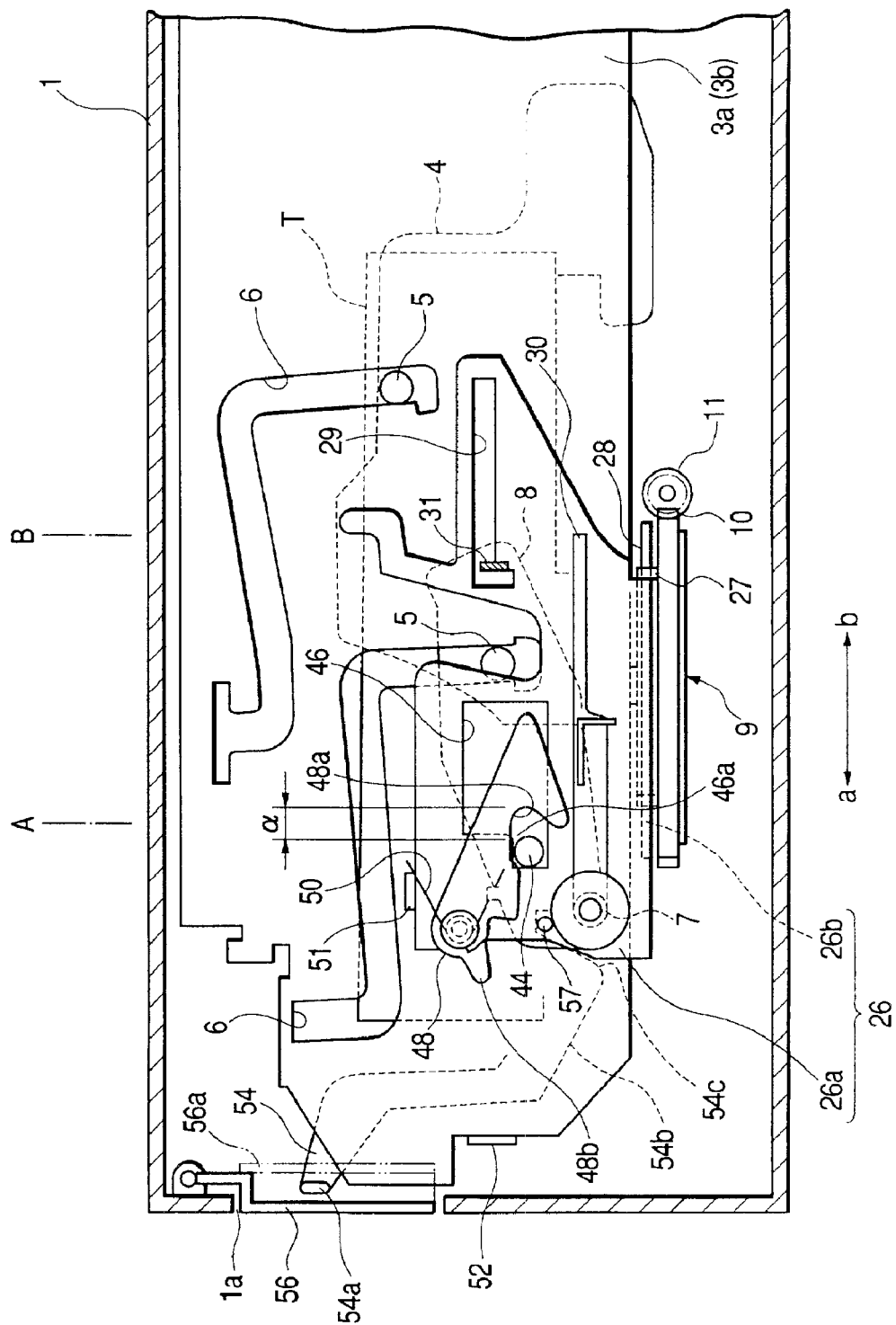
FIG. 4 is an enlarged partially cutaway side view of the embodiment in the state where the moving table is backward moved.
Figure 5:
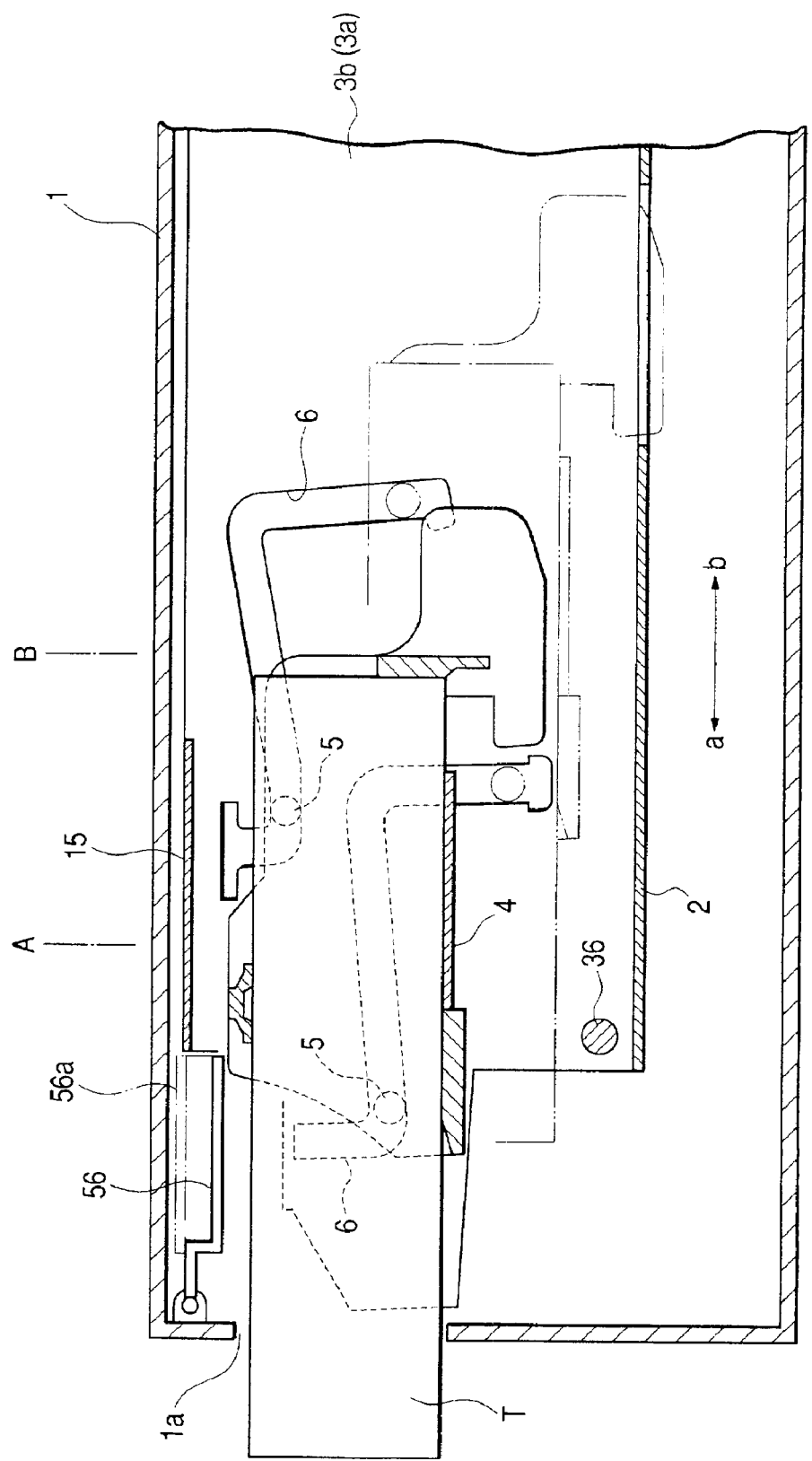
FIG. 5 is an enlarged longitudinal section view of the embodiment in the case where a tape cassette is inserted.

When the moving table 4 is to be pressingly placed at the cassette placing position B by the press spring 16 so as not to be lifted, the pressing force P of the press spring 16 is returned to the original one so that an excessive pressing force is not applied (see FIG. 4). During the ejecting operation, therefore, the moving table 4 can be easily lifted up from the cassette placing position B.

In summary, the operations of injecting and ejecting the tape cassette T are allowed to be performed smoothly and surely, simply by slightly changing an existing structure. Therefore, the embodiment can be practically used.

Figure 6:
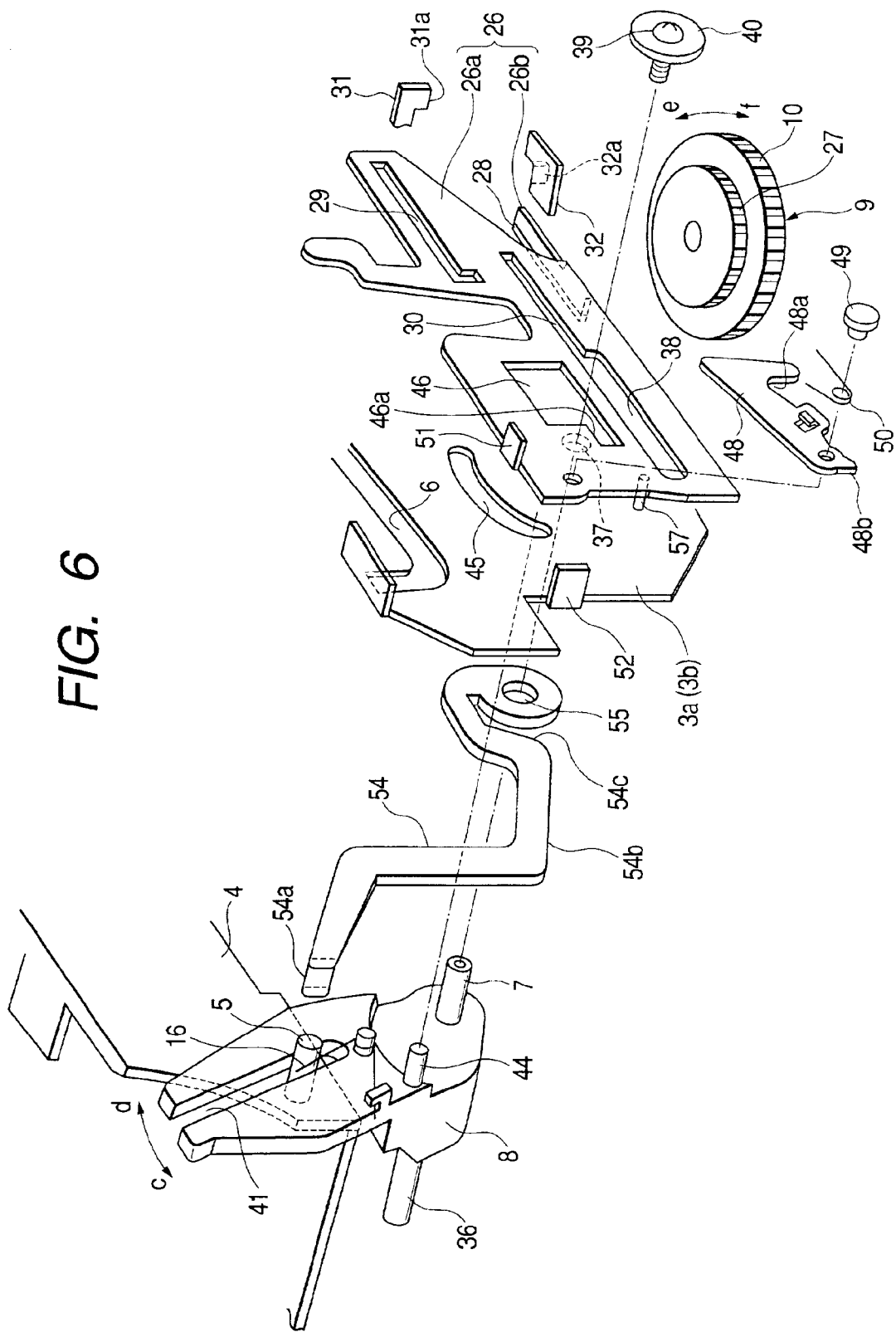
FIG. 6 is an exploded perspective view of main portions of the embodiment.

As shown in FIGS. 3 and 6, an engaging pin 44 which protrudes from the right rocking lever 8 is passed through an engaging hole 46 opened in the slide plate body 26a, with passing through a hole 45 of the right guide plate 3a. As shown in FIG. 3, under the state where the moving table 4 is on standby at the cassette inserting position A, the slide plate 26 is backward slid so that the engaging pin 44 is pressed by a peripheral portion of the engaging hole 46, whereby the rocking lever 8 is swung backward (d) so that the moving table 4 can be moved backward (b) toward the cassette placing position B. In this configuration, it is requested only to engage the engaging hole 46 with the engaging pin 44. Therefore, the configuration is simple, and the production cost can be lowered.

As shown in FIGS. 3 and 6, an arcuate lock groove 48a which is engageable with the engaging pin 44 is formed in a tip end portion of a lock lever 48, and the basal end portion of the lock lever 48 is pivotally attached via a pivot shaft 49 to a front upper portion of the slide plate body 26a. One end of an engaging spring 50 which is wound around the pivot shaft 49 is engaged with the lock lever 48, and the other end of the engaging spring 50 is engaged with an engaging piece 51 which is bent from the upper end of the slide plate 26, thereby urging the lock lever 48 toward the engaging pin 44. A protruding portion 48b protrudes from a basal end portion of the lock lever 48 so as to be opposed to a lock canceling piece 52 which is bent from the front end of the right guide plate 3a.

In the configuration, as shown in FIG. 4, under the state where the moving table 4 is placed at the cassette placing position B, when the slide plate 26 is forward slid in response to an eject signal, also the lock lever 48 is slid in the same direction, and, in the state before the sliding, a gap a the width of which is approximately equal to the diameter of the engaging pin 44 is formed between the lock groove 48a and the engaging pin 44, so that a short time lag is produced before the lock groove 48a is engaged with the engaging pin 44. Because of this time lag, it is possible to operate a door 56 of the tape cassette insertion port 1a so as to be opened in advance to the forward motion a of the moving table 4. In accordance with the forward sliding of the slide plate 26, the lock groove 48a is then engaged with the engaging pin 44, whereby the rocking lever 8 is swung forward (c) to move forward (a) the moving table 4, so that a tape cassette T which is set on the moving table 4 can be ejected without colliding against the door 56.

When the moving table 4 is moved forward (a) to the cassette inserting position A (see FIG. 3), the protruding portion 48b of the lock lever 48 is engaged with the lock canceling piece 52, whereby the lock lever 48 is separated from the engaging pin 44 against the engaging spring 50 to cancel the lock. When, during the injecting operation, the tape cassette T is inserted to the moving table 4 which is on standby at the cassette inserting position A (see FIG. 5), therefore, the moving table 4 is allowed to be moved backward (b), and the backward motion b can be surely detected by a detector. Although the lock lever 48 corresponds in function to the clutch in the conventional art, the lock lever is simpler in structure than the clutch, and can be economically produced.

It is important to emphasize that the combination of the lock lever 48, the engaging pin 44, the engaging spring 50, and the lock canceling piece 52 produces both the functions, or the time lag producing function and the clutch function. This enables the operations of injecting and ejecting the tape cassette T to be smoothly performed.

Referring to FIGS. 4 and 6, 46a denotes a lift-preventing portion 46a which is formed in the peripheral portion of the engaging hole 46, and which, when the moving table 4 is placed at the cassette placing position B, abuts against or approaches the upper edge of the engaging pin 44 to prevent the moving table 4 from being lifted. The reference numeral 54 denotes a door open lever in which a through hole 55 in a basal end portion is rotatably fitted onto the pivot shaft 7 and the tip end portion 54a is engaged with a side edge portion 56a of the door 56. When the slide plate 26 is slid forward and backward to engage an opening pin 57 protruding from the slide plate 26 with inclined faces 54b and 54c of the door open lever 54, the door open lever 54 is swung so that the door 56 can be opened (see FIG. 5).

The function of the above configuration will be described. During the injecting operation, as shown in FIG. 3, the door 56 is pushed up by the tape cassette T, and the tape cassette T is inserted to the moving table 4 which is on standby at the cassette inserting position A (see FIG. 5), whereby the moving table 4 is pushed-in in the direction of the backward motion b. In accordance with this, as shown in FIG. 7A, the rocking lever 8 is swung backward (d), and the moving table 4 is passed through the predetermined pushing zone K to reach the detection position E. In response to the detection signal from the detector which detects the pushing-in, the operation is switched to an automatic pulling-in operation.

During the automatic pulling-in operation, as shown in FIG. 7B, the guide rod 5 which is pushed along the guide hole 6 in the direction of the backward motion b is transferred onto the cam 42 against the press spring 16, whereby the other end portion of the press spring 16 is pushed forward by the predetermined distance i to increase the pressing force P of the press spring 16. The increased pressing force P prevents the moving table 4 from being pushed back in the direction of forward motion a.

When the rocking lever 8 reaches the detection position E and the operation is switched to the automatic pulling-in operation, the rotating cam 9 is rotated forward (e) by the driving source via the worm gear 11 and the worm gear 10, and the slide plate 26 is backward slid via the pinion 27 of the rotating cam 9 and the rack 28. This causes the peripheral portion of the engaging hole 46 to press the engaging pin 44, whereby the rocking lever 8 is swung backward (d), so that the moving table 4 is horizontally moved backward (b) along the guide holes 6, and then vertically lowered to be placed at the cassette placing position B (see FIG. 4). The magnetic tape t is then pulled out from the tape cassette T (see FIG. 1), and subjected to a process such as replay.

As a result of the backward sliding of the slide plate 26, the protruding portion 48b of the lock lever 48 is separated from the lock canceling piece 52, and the lock lever 48 is downward swung by the engaging spring 50 to abut against the engaging pin 44. At this time, the gap α the width of which is approximately equal to the diameter of the engaging pin 44 is formed between the engaging pin 44 and the lock groove 48a (see FIG. 4).

The lift-preventing portion 46a which is formed in the peripheral portion of the engaging hole 46 abuts against or approaches the upper edge of the engaging pin 44 (see FIG. 4). According to this configuration, the moving table 4 which is placed at the cassette placing position B is prevented from being lifted, so that the magnetic tape t can be smoothly loaded from the tape cassette T which is set on the moving table 4 and a clear image can be replayed.

When an eject button (not shown) is thereafter pressed, the rotating cam 9 is rotated reversely (f) by the driving source in response to an eject signal, whereby the slide plate 26 is forward slid via the pinion 27 of the rotating cam 9 and the rack 28. This causes the opening pin 57 to be pressed against the rear inclined face 54c of the door open lever 54 to upward swing the door open lever 54, so that the door 56 is opened. Thereafter, the lock groove 48a of the lock lever 48 is engaged with the engaging pin 44, the rocking levers 8 are swung forward (c), so that the moving table 4 is vertically lifted along the guide holes 6 and then moved horizontally forward (a) to the cassette inserting position A, and the tape cassette T is ejected (see FIG. 5).

According to the first aspect of the invention, when, during the injecting operation, a tape cassette is inserted to the moving table which is on standby at the cassette inserting position, the moving table is slightly pushed-in in the backward motion direction, and the guide rod protruding from the moving table is transferred onto the cam formed in the recessed groove of the rocking lever, to increase the pressing force of the press spring, so that the increased pressing force prevents the moving table from being pushed back in the forward motion direction. Even when the moving table is insufficiently pushed in, therefore, the moving table is not returned to the state where it has not yet been pushed in, and hence the tape cassette can be surely injected.

The press spring has a return preventing function which prevents the moving table from being returned during the injecting operation as described above, and a pressing function which prevents the moving table placed at the cassette placing position from being accidentally lifted. Since the press spring is used for exerting both the two functions, the number of parts can be reduced and the production cost can be lowered.

When the moving table is to be pressingly placed at the cassette placing position by the press spring so as not to be lifted, the pressing force of the press spring is returned to the original one so that an excessive pressing force is not applied. During the ejecting operation, therefore, the moving table can be easily lifted up from the cassette placing position.

In summary, the operations of injecting and ejecting a tape cassette are allowed to be performed smoothly and surely, simply by slightly changing an existing structure. Therefore, the invention can be practically used.

According to the second aspect of the invention, when, during the injecting operation, the moving table is pushed-in in the backward motion direction by inserting a tape cassette to the moving table which is on standby at the cassette inserting position, the return preventing means operates to prevent the moving table from being pushed back in the forward motion direction. Even when the moving table is insufficiently pushed in, therefore, the moving table is not returned to the state where it has not yet been pushed in, and hence the tape cassette can be surely injected.

According to the third aspect of the invention, when, during the injecting operation, the moving table is pushed-in in the backward motion direction by inserting a tape cassette to the moving table which is on standby at the cassette inserting position, the pressing force of the press spring is increased by the cam to prevent the moving table from being pushed back in the forward motion direction. Even when the moving table is insufficiently pushed in, therefore, the moving table is not returned to the state where it has not yet been pushed in, and hence the tape cassette can be surely injected.

According to the fourth aspect of the invention, when, during the injecting operation, the moving table is pushed-in in the backward motion direction by inserting a tape cassette to the moving table which is on standby at the cassette inserting position, the guide rod protruding from the moving table is transferred onto the cam formed in the recessed groove of the rocking lever, to increase the pressing force of the press spring, so that the increased pressing force prevents the moving table from being pushed back in the forward motion direction. Even when the moving table is insufficiently pushed in, therefore, the moving table is not returned to the state where it has not yet been pushed in, and hence the tape cassette can be surely injected.

What is claimed is:

1. A magnetic tape device comprising:
   a pair of right and left guide plates;
   a tape cassette moving table that is placed to be movable forward and backward between a cassette inserting position and a cassette placing position that are set between said pair of right and left guide plates;
   a rocking lever pivotally attached to one of said guide plates;
   a guide rod protruding from said moving table which is engaged with a recessed groove formed in a tip end portion of said rocking lever;
   a press spring engagingly held by said rocking lever and pressed against said guide rod;
   a cam formed in said recessed groove of said rocking lever; and
   a driving source
   wherein said moving table is slightly pushed-in in a backward motion direction by inserting a tape cassette to said moving table that is on standby at the cassette inserting position, and said driving source is activated in response to detection of the pushing, thereby backward swinging said rocking lever, and backward moving said moving table via said guide rod to the cassette placing position; and
   wherein when said moving table is pushed-in from the cassette inserting position in the backward motion direction, said guide rod is transferred onto said cam to increase a pressing force of said press spring.

2. A magnetic tape device, comprising:
   a pair of right and left guide plates;
   a tape cassette moving table that is placed to be movable forward and backward between a cassette inserting position and a cassette placing position that are set between said pair of right and left guide plates, said moving table being slightly pushed-in in a backward motion direction by inserting a tape cassette to said moving table that is on standby at the cassette inserting position;
   a driving source activated in response to detection of the pushing, to backward moving said moving table to the cassette placing position; and
   a return preventing member including a guide rod disposed on said moving table, a press spring engaging with said guide rod to elastically press said moving table toward the cassette placing position, and a cam being abuttable to said guide rod when said moving table is pushed-in in the backward motion direction from the cassette inserting position to relatively move said guide rod with respect to said press spring to thereby increase a pressing force of said press spring on said moving table.

3. A magnetic tape device comprising:
   a pair of right and left guide plates;
   a tape cassette moving table that is placed to be movable forward and backward between a cassette inserting position and a cassette placing position that are set between said pair of right and left guide plates, said moving table being slightly pushed-in in a backward motion direction by inserting a tape cassette to said moving table that is on standby at the cassette inserting position;
   a driving source activated in response to detection of the pushing, to backward moving said moving table to the cassette placing position; and
   a return preventing member operating when said moving table is pushed from the cassette inserting position in the backward motion direction, for preventing said moving table from being pushed back in a forward motion direction;
   a guide rod that protrudes from said moving table;
   a rocking lever pivotally attached to one of said guide plates, a recessed groove formed in a tip end portion of said rocking lever being engaged with said guide rod;
   a press spring engagingly held by said rocking lever, and pressed against said guide rod;
   a cam engaged with said press spring;
   wherein said return preventing member is configured by said cam, and when said moving table is pushed-in from the cassette inserting position in the backward motion direction, a pressing force of said press spring is increased by said cam to prevent said moving table from being pushed back in the forward motion direction.

4. The magnetic tape device according to claim 3, wherein said cam is formed in said recessed groove of said rocking lever, and when said moving table is pushed-in from the cassette inserting position in the backward motion direction, said guide rod is transferred onto said cam to increase the pressing force of said press spring.

* * * * *